United States Patent
Prats

(10) Patent No.: US 10,780,581 B1
(45) Date of Patent: Sep. 22, 2020

(54) GENERATION AND APPLICATION OF REACHABILITY MAPS TO OPERATE ROBOTS

(71) Applicant: X Development LLC, Mountain View, CA (US)

(72) Inventor: Mario Prats, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 273 days.

(21) Appl. No.: 16/009,121

(22) Filed: Jun. 14, 2018

(51) Int. Cl.
*B25J 9/16* (2006.01)

(52) U.S. Cl.
CPC .......... *B25J 9/1664* (2013.01); *B25J 9/161* (2013.01); *B25J 9/1661* (2013.01); *B25J 9/1694* (2013.01)

(58) Field of Classification Search
CPC ........ B25J 9/161; B25J 9/1661; B25J 9/1665; B25J 9/1694
See application file for complete search history.

(56) References Cited

U.S. PATENT DOCUMENTS

| | | | | |
|---|---|---|---|---|
| 2009/0055020 A1* | 2/2009 | Jeong | ............ | G05D 1/0272 700/251 |
| 2009/0149990 A1* | 6/2009 | Myeong | ............ | G05D 1/0274 700/245 |
| 2018/0304472 A1* | 10/2018 | Angle | ............ | G05D 1/0022 |

OTHER PUBLICATIONS

Oßwald, Stefan et al. "Efficient coverage of 3D environments with humanoid robots using inverse reachability maps." 2017 IEEE-RAS 17th International Conference on Humanoid Robotics (Humanoids) (2017): 151-157. (Year: 2017).*
Akinola, Iretiayo et al. "Workspace Aware Online Grasp Planning." 2018 IEEE/RSJ International Conference on Intelligent Robots and Systems (IROS) (2018): 2917-2924. (Year: 2018).*
Porges, et al.; Reachability and Dexterity: Analysis and Applications for Space Robotics; 7 pages; dated 2015.
Diankov, Rosen; Automated Construction of Robotic Manipulation Programs; The Robotics Institute Carnegie Mellon University; 263 pages; dated Aug. 26, 2010.
Zacharias et al.; Capturing Robot Workspace Structure: Representing Robot Capabilities; IEEE/RSJ; 8 pages; dated 2007.
Diankov, Rosen et al.; BiSpace Planning: Concurrent Multi-Space Exploration; 8 pages; dated 2008.
Vahrenkamp, Nikolaus et al.; Efficient Inverse Kinematics Computation based on Reachability Analysis; International Journal of Humanoid Robotics; vol. 09/04; pp. 1-26; dated 2012.

(Continued)

*Primary Examiner* — Robert T Nguyen
(74) *Attorney, Agent, or Firm* — Middleton Reutlinger

(57) ABSTRACT

Implementations are provided for improved robot reachability maps. Multiple reachability maps for a robot may be indexed on a distance of an end effector from a plane and a tilt of the end effector. Each reachability map may include multiple cells, each representing a base pose of the robot. A target pose of the end effector may be used to determine a target distance/tilt, which is used to select a given reachability map. A given cell of the given reachability map may be used to determine a first candidate set of joint parameters for the robot. In some implementations, one or more additional, neighboring cells of the plurality of cells may be used to determine additional candidate set(s) of joint parameters. A given set of joint parameters to be implemented to achieve the target pose of the end effector may be selected and used to operate the robot.

20 Claims, 4 Drawing Sheets

(56) References Cited

OTHER PUBLICATIONS

Gienger, Michael et al.; Optimization of Fluent Approach and Grasp Motions; IEEE; 7 pages; dated 2008.
Dong, Jun et al.; Orientation-based Reachability Map for Robot Base Placement; IEEE; 6 pages; dated 2015.
Gray, Steven et al.; A Single Planner for a Composite Task of Approaching, Opening and Navigating through Non-spring and Spring-loaded Doors; 8 pages; dated 2013.
Zacharias, Franziska et al.; Positioning Mobile Manipulators to Perform Constrained Linear Trajectories; 7 pages; dated 2008.
Makhal, Abhijit et al.; Reuleaux: Robot Base Placement by Reachability Analysis; IEEE; 9 pages; dated 2018.

* cited by examiner

GENERATION AND APPLICATION OF REACHABILITY MAPS TO OPERATE ROBOTS

BACKGROUND

Forward kinematics are equations used to calculate a robot end effector's pose in Cartesian space based on the robot's joint parameters. Forward kinematic equations are deterministic because a single set of joint parameters yields the same Cartesian end effector pose every time. By contrast, inverse kinematics are equations used to calculate joint parameters that achieve a target robot end effector pose in Cartesian space. Unlike forward kinematics, with inverse kinematics there typically are multiple sets of joint parameters (or "joint parameter solutions") that if implemented by the robot yield the target end effector pose in Cartesian space. In many instances the search space of candidate solutions for a single target end effector pose may be enormous, and some of these candidate solutions may be unreachable, e.g., due to singularities.

Inverse kinematic equations tend to be expensive to compute, particularly on unreachable targets such as those that cause robot singularities. This can be problematic when performing robot grasp planning, which involves computing inverse kinematics for potentially large numbers of candidate end effector poses. Base pose planning—i.e., selecting a base pose of a (typically) mobile robot to best achieve a target end effector pose in Cartesian space—compounds the problem further because it involves computing multiple robot grasps. Many existing approaches employ incremental inverse kinematics (e.g., gradient descent) using randomly-selected seeds. The search for a solution executes until a viable solution (i.e. a viable set of joint parameters) is found or a timeout is reached. In some cases finding a suitable seed may be the most computationally expensive part. Taken together, these issues result in base pose planning being slow and not guaranteed to find an optimal pose.

One technique for enabling quicker grasp and/or base pose planning is to precompute joint parameters solutions offline, e.g., as a "reachability map" that maps between joint space (e.g., joint parameter sets) and Cartesian poses. In some implementations, a reachability map may be precomputed, e.g., for a given robot, and may map end effector poses of the given robot in Cartesian space to joint space. In some cases the reachability map may be stored in the robot's memory and used online to plan base poses and/or sequences of end effector poses given target Cartesian end effect pose(s). However, reachability maps tend to be massive, requiring an inordinate amount of robot memory to store, and they do not scale if the robot's configuration changes. Their size also makes it relatively time consuming to locate a particular set of joint parameters given a target Cartesian end effector pose.

SUMMARY

The present disclosure is generally directed to methods, apparatus, and computer-readable media (transitory and non-transitory) for generating and using improved reachability maps to more quickly identify joint parameter solutions, while avoiding unreachable solutions and without the massive memory requirements of comprehensive reachability maps. In various implementations, one or more reachability maps configured with selected aspects of the present disclosure may be computed offline (i.e. not during real time robot operation). These improved reachability maps, which in some cases may map target Cartesian end effector poses to joint parameter solution(s), may be indexed in various ways in order to facilitate rapid location of joint parameter solutions. For example, in some implementations, multiple reachability maps may be generated for various aspects of multiple target end effector poses.

In some implementations, a target distance of an end effector (or more precisely, an end effector reference point) from a plane may be computed from a given target end effector pose in Cartesian space. In some cases this distance may be a distance of the target end effector pose from the ground plane on which a mobile robot operates. Similarly, a target end effector "tilt" relative to the plane (e.g., relative to the ground plane) may be computed based on the target end effector pose in Cartesian space. In some such implementations, an end effector "tilt" may be determined from an operational axis of the end effector, from an angle at which the end effector approaches its target to perform some operation (e.g., glue, solder, stitch, grasp, etc.). In various implementations, a reachability map be generated for each target distance-tilt pair. Thus, when a new target end effector pose is determined (e.g., as part of a path planning process), a target distance-tilt pair of that target end effector pose relative to a plane (e.g., the ground plane) may be computed. The target distance-tilt pair may then be used to select, e.g., from a plurality of precomputed reachability maps, a reachability map associated with the target distance/tilt pair.

In various implementations, each reachability map generated for a particular robot and associated with a particular distance-tilt pair may include a plurality of cells. Each cell may represent, for example, a candidate base pose of the particular robot that can be used to achieve the target distance-tilt associated with the respective reachability map. Cells representing base poses that are not usable to yield the target distance-tilt pair associated with the respective reachability map may be flagged as unreachable, and therefore may not be considered. Accordingly, once a target distance-tilt is known, the search space for candidate base poses that can achieve the target distance-tilt pair is reduced to those represented by "reachable" cells in a reachability map.

In some implementations, each reachable cell in a reachability map may include joint parameters that are precomputed, e.g., for a center point of the cell (a cell may actually be a volume, e.g., cubic, spherical, etc.). However, it will often be the case that the center point of a cell does not precisely align with the target end effector pose. For example, a target end effector pose may have x/y coordinates that is slightly offset from the x/y coordinate of the center point of a reachable cell. Accordingly, in various implementations, incremental inverse kinematics may be employed, with the joint parameters associated with the center of the cell used as a seed solution, in order to compute joint parameters that more precisely yield the desired x/y coordinate and/or yaw. For example, gradient descent may be applied, with the joint parameters associated with the center point of the cell used as a seed solution.

In various implementations, once a reachability map is selected, a given (reachable) cell of the plurality of cells of the reachability map may be selected as a start point seed solution. For example, in some implementations, a cell corresponding to the robot's current base pose (e.g., x, y, yaw) may be examined to determine whether it is reachable. If the answer is yes, then techniques described herein may be employed to find a joint parameter solution using that cell as a seed solution. If the answer is no, then the robot may be moved/rotated accordingly. For example, a given reachability map likely will have a cluster (or multiple clusters, depending on a variety of factors) of reachable cells. In various implementations, a current base pose of the robot (e.g., x, y, yaw) relative to an x/y/yaw of the target end effector pose may be used to operate the robot to move to a given cell of a cluster of reachable cells. For instance, if it is desired to minimize translational movement of the robot, the robot may be translated/rotated to a boundary of the cluster of cells. If instead it is desired to limit a robot arm's reach, then the robot may be operated so that it is translated to a center of the cluster of reachable cells. In either case, once the robot's base pose corresponds to a base pose associated with a reachable cell, techniques described herein may be employed to find a joint parameter solution.

There is no guarantee that the precomputed joint parameters associated with the first reachable cell are optimal. There likely may be other reachable cells representing other candidate joint parameter solutions that would be more efficient than the joint parameter solution associated with the first given cell. Accordingly, in various implementations, one or more neighboring cells may be identified, and joint parameters for those neighbor cells may be computed, e.g., using incremental inverse kinematics as described previously, to identify potentially more optimal solutions.

Techniques described herein may also be used to identify joint parameter solutions for multiple target end effector poses at once, e.g., by performing various operations using multiple reachability maps. Suppose a robot is instructed to interact with two (or more) objects. This may require a different target end effector pose for each object. If the two objects are sufficiently proximate to one another, techniques described herein can be used to identify joint parameter solutions and/or base poses that enable the robot to reach both objects. In some implementations, a target height-tilt pair may be identified for each of the two target end effector poses. These pairs may be used to identify two corresponding reachability maps. In some implementations, these reachability maps may be rotated and/or translated as described herein (i.e. pursuant to the target end effector pose) and then used to calculate their intersection. This intersection comprises another reachability map that encodes (e.g., as cells) base poses from which the robot can reach both objects.

Similarly, suppose another a set of objects (and corresponding target end effector poses) are not all reachable from a single base pose. It is still possible to retrieve a reachability map for each target height-tilt pair, translate/rotate the multiple reachability maps accordingly, and compute a union between the multiple reachability maps. The result is another reachability map that encodes robot base poses from which the robot can reach at least one of the objects.

Techniques described herein give rise to various technical advantages. For example, precomputing reachability maps offline and avoiding online computation of inverse kinematics may conserve robotic computing resources and/or may lead to faster, more consistent, and/or more predictable robot operation. Moreover, reachability maps precomputed using techniques described herein may require less memory because one reachability map may be applicable for a multitude of target end effector poses. As another example, by identifying reachable cells and their neighbors, and then using precomputing joint parameter solutions associated with these cells as seeds for incremental inverse kinematic computation, it is possible to use a relatively small number of maximum iterations on, for instance, a gradient descent step. This speeds up computation and therefore preserves computational resources.

In some implementations, a computer implemented method may be provided that includes: providing a plurality of reachability maps for a robot, each reachability map of the plurality of reachability maps being associated with a distance of a reference point of an end effector from a plane and a tilt of the end effector relative to the plane, and each reachability map of the plurality of reachability maps including a plurality of cells, wherein each cell of the plurality of cells represents a candidate base pose of the robot; identifying a target pose of the end effector; determining, based on the target pose of the end effector, a target distance of the end effector from the plane and a target tilt of the end effector relative to the plane; selecting a given reachability map from the plurality of reachability maps based on the target distance and the target tilt; selecting a given cell of the plurality of cells of the given reachability map; determining a first candidate set of joint parameters for the robot based on the given cell; identifying one or more additional cells of the plurality of cells that are neighbors of the given cell; determining one or more additional candidate sets of joint parameters for the robot based on the one or more additional cells of the plurality of cells; selecting, from a superset of candidate joint parameter sets that consists of the first candidate set and the one or more additional candidate sets, a given set of joint parameters to be implemented to achieve the target pose of the end effector; and operating the robot in accordance with the given set of joint parameters.

This method and other implementations of technology disclosed herein may each optionally include one or more of the following features.

In various implementations, the candidate base pose represented by each cell of the plurality of cells of each of the plurality of reachability maps may include an x coordinate, a y coordinate, and a yaw value. In various implementations, the given cell of the plurality of cells may be selected based on a current base pose of the robot. In various implementations, the given cell may lie on a boundary between a cluster of reachable cells of the plurality of cells and unreachable cells of the plurality of cells. In various implementations, the given cell may lie at a center of a cluster of reachable cells of the plurality of cells.

In various implementations, the first candidate set of joint parameters may be calculated using incremental inverse kinematics based on a seed set of joint parameters associated with the given cell. In various implementations, the seed set of joint parameters may be associated with a center point of the given cell. In various implementations, the incremental inverse kinematics may include gradient descent.

In various implementations, the method may further include: identifying another target pose of the end effector; determining, based on the another target pose of the end effector, another target distance of the end effector from the plane and another target tilt of the end effector relative to the plane; selecting another reachability map from the plurality of reachability maps based on the another target distance and the another target tilt; and determining an intersection or union between the given reachability map and the another reachability map. In various implementations, the given cell may be selected from the intersection or union between the given reachability map and the another reachability map.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
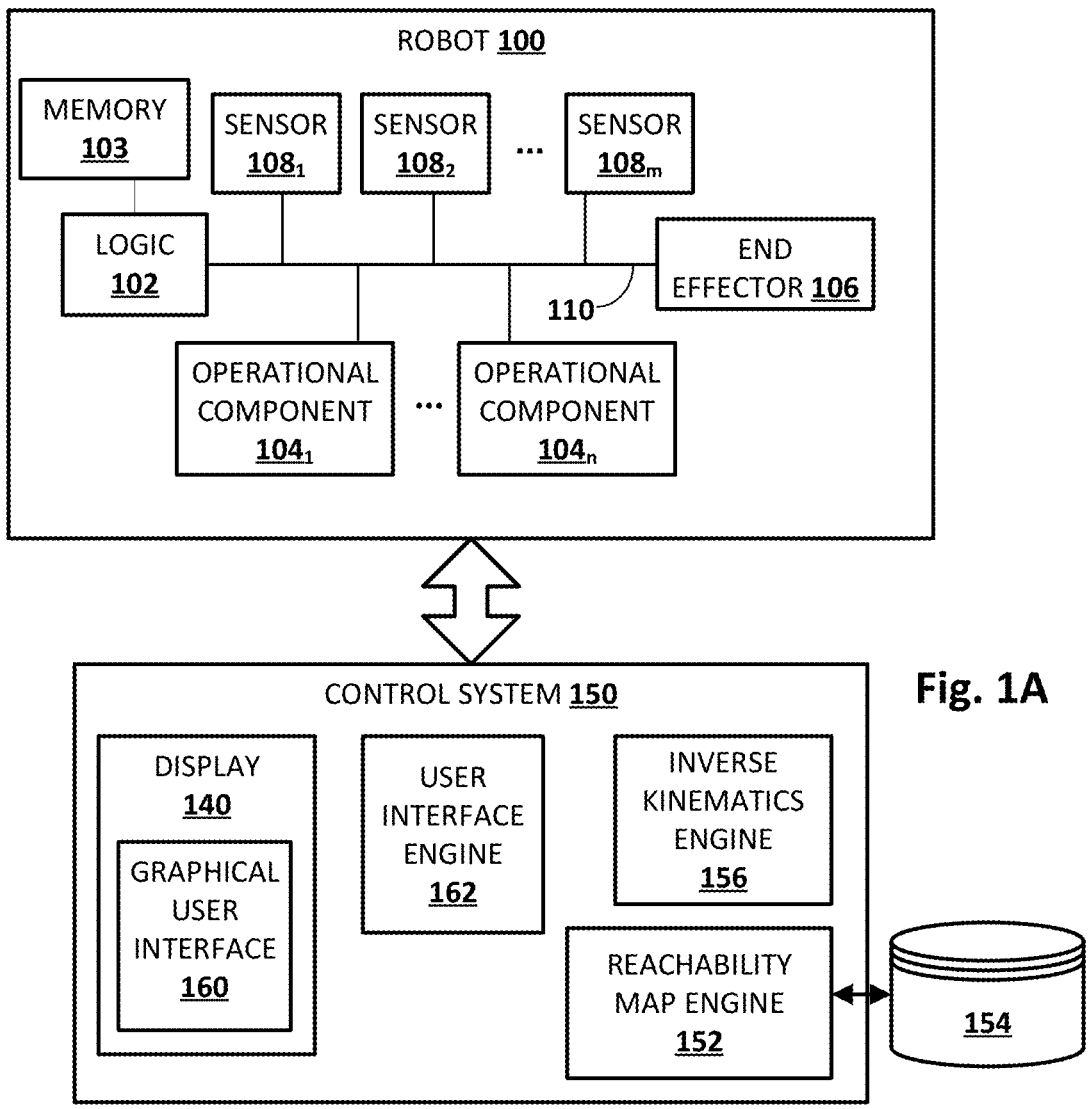
FIG. 1A schematically depicts an example environment in which disclosed techniques may be employed, in accordance with various implementations.
Figure 1B:
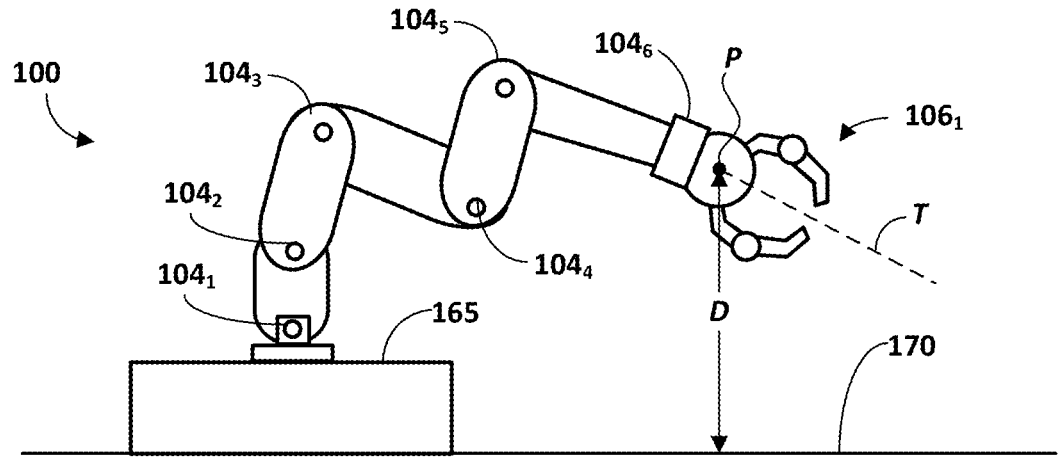
FIG. 1B depicts an example robot, in accordance with various implementations.

FIG. 1A is a schematic diagram of an example environment in which selected aspects of the present disclosure may be practiced in accordance with various implementations. A robot 100 may be in communication with a control system 150. Robot 100 may take various forms, including but not limited to a telepresence robot (e.g., which may be as simple as a wheeled vehicle equipped with a display and a camera), a robot arm, a humanoid, an animal, an insect, an aquatic creature, a wheeled device, a submersible vehicle, an unmanned aerial vehicle ("UAV"), and so forth. One non-limiting example of a robot arm is depicted in FIG. 1B. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, logic 102 may be operably coupled with one or more operational components $104_{1-n}$, one or more end effectors 106, and/or one or more sensors $108_{1-m}$, e.g., via one or more buses 110. As used herein, an "operational component" 104 of a robot may broadly refer to actuators, motors (e.g., servo motors), joints, shafts, gear trains, pumps (e.g., air or liquid), pistons, drives, or other components that may create and/or undergo propulsion, rotation, and/or motion. Some operational components 104 may be independently controllable, although this is not required. In some instances, the more operational components robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 106 may be removable, and various types of modular end effectors may be installed onto robot 100, depending on the circumstances. Some robots, such as some telepresence robots, may not be equipped with end effectors. Instead, some telepresence robots may include displays to render visual representations of the users controlling the telepresence robots, as well as speakers and/or microphones that facilitate the telepresence robot "acting" like the user.

Sensors 108 may take various forms, including but not limited to 3D laser scanners or other 3D vision sensors (e.g., stereographic cameras used to perform stereo visual odometry) configured to provide depth measurements, two-dimensional cameras, light sensors (e.g., passive infrared), force sensors, pressure sensors, pressure wave sensors (e.g., microphones), proximity sensors (also referred to as "distance sensors"), depth sensors, torque sensors, barcode readers, radio frequency identification ("RFID") readers, radars, range finders, accelerometers, gyroscopes, compasses, position coordinate sensors (e.g., global positioning system, or "GPS"), speedometers, edge detectors, and so forth. While sensors $108_{1}$-$m$ are depicted as being integral with robot 100, this is not meant to be limiting. In some implementations, sensors 108 may be located external to, but may be in direct or indirect communication with, robot 100, e.g., as standalone units or as part of control system 150.

Control system 150 may include one or more computing systems connected by one or more networks (not depicted) that control operation of robot 100 to various degrees. An example of such a computing system is depicted schematically in FIG. 4. In some implementations, control system 150 may be operated by a user (not depicted) to exert a relatively high level of control over robot 100, e.g., in real time in response to signals received by a user interface engine 162 and/or one or more readings from one or more sensors 108. In other implementations, control system 150 exerts less direct control over robot 100. For example, control system 150 may provide robot 100 with a high level task such as "go to location, identify person, follow person." Logic 102 on robot 100 may convert such high level tasks into robot action, e.g., by translating one or more high level tasks into a plurality of motion primitives executable by robot 100. In some implementations, control system 150 may include a display 140 (e.g., CRT, LCD, touchscreen, etc.) on which a graphical user interface 160 operable to remotely control robot 100 may be rendered.

Various modules or engines may be implemented as part of control system 150 as software, hardware, or any combination of the two. For example, in FIG. 1A, control system 150 includes a reachability map engine 152, an inverse kinematics engine 156, and the aforementioned user interface engine 162. Inverse kinematics engine 156 may be configured to receive, as input, target poses of robot 100 (e.g., target end effector poses) in Cartesian space, and to provide, as output, corresponding joint parameters in joint space. As noted in the background, computing inverse kinematics may be relatively expensive from a computational resource standpoint, making real time operation of robot 100 challenging. Accordingly, in various implementations, reachability map engine 152 may be configured to generate (e.g., based on output from inverse kinematics engine 156) indices of precomputed joint parameters in joint space associated with predetermined poses in Cartesian space. By using precomputed joint parameters, rather than computing them in real time, computational resources are saved, and operation of robot 100 is improved (e.g., less lag, more predictable operation, etc.). Techniques described herein may be implemented by one or both of inverse kinematics engine 156 and/or reachability map engine 152.

While robot 100 and control system 150 are depicted separately in FIG. 1, this is not meant to be limiting. In various implementations, one or more aspects (e.g., modules, engines, etc.) depicted in FIG. 1 as implemented on one of robot 100 or control system 150 may be implemented on the other, may be distributed across both, and/or may be distributed across one or both in combination with other components not depicted in FIG. 1. In implementations where robot 100 and control system 150 are separate, they may communicate over one or more wired or wireless networks (not depicted) or using other wireless technology, such as radio, Bluetooth, infrared, etc. In other implementations, control system 150 may be implemented entirely or in part using logic 102 of robot 100.

FIG. 1B depicts a non-limiting example of a robot 100 in the form of a robot arm. An end effector $106_1$ in the form of a gripper claw is removably attached to a sixth operational component $104_6$ of robot 100. In this example, six operational components $104_{1-6}$ are indicated, mostly in the form of joints. However, this is not meant to be limiting, and robots may have any number of operational components (e.g., joints). Robot 100 also includes a base 165, and is depicted in a particular selected configuration or "pose."

In various implementations, inverse kinematics engine 156 and/or reachability map engine 152 (which in some implementations may be combined into a single module or engine) may be configured to make available, e.g., in an index 154, precomputed joint parameter solutions of robot 100. For example, inverse kinematics engine 156 may precompute joint parameter solutions for a plurality of target end effector poses, e.g., while robot 100 is offline. Reachability map engine 152 may organize these precomputed joint parameter solutions in index 154 so that they are easily and quickly reachable, e.g., by or for robot 100 during operation of robot 100. Consequently, robot 100 and/or control system 150 is not required to perform computationally-expensive inverse kinematic computations in real time.

In some implementations, reachability map engine 152 may organize precomputed joint parameter solutions, e.g., generated by inverse kinematics engine 156, into a plurality of reachability maps for storage in index 154. In some such implementations, each reachability map in index 154 may be associated with (e.g., indexed by) a target end effector pose and/or a range of target end effector poses. For example, in some implementations, each reachability map may be indexed in index 154 by a distance of a reference point (e.g., arbitrarily-selected point, center of mass of end effector 106, etc.) of end effector 106 from a plane when the end effector is in a target pose, and a tilt of end effector 106 relative to the plane. In many implementations, the term "plane" refers to the ground plane on which a mobile robot operates; however, this is not meant to be limiting. Thus, the distance of the reference point of end effector 106 and the plane is, in many cases, the distance from the reference point from the ground. An example of this is depicted in FIG. 1B, wherein a distance D from a reference point P to a ground plane 170 is depicted.

As used herein, a "tilt" of end effector 106 relative to a plane may refer to, for instance, a general orientation of end effector 106 relative to ground plane 170. In some implementations, "tilt" may be defined as a directional vector in three dimensional Cartesian space. In some implementations, "tilt" may be manifested as an orientation of a longitudinal axis of end effector 106 relative to ground plane 170. In some implementations, "tilt" may refer to an orientation of an operable component of end effector 106. For example, suppose end effector 106 comprises a welding torch. The tilt of such an end effector might be the orientation of a nozzle of the torch that expels heat/flame (e.g., an angle of egress of the flame from the torch). As another example, the tilt of end effector 106 may be a direction of a nozzle that expels, for example, glue or paint (again, an angle of egress of the paint/glue). In implementations in which end effector 106 is a gripper such as the claw-type gripper depicted in FIG. 1B, the tilt T of end effector 106 may be, for instance, a directional vector that travels midway between two or more claws in a direction parallel to a plane at which the two claws nominally impact each other when the gripper is closed without any object between the claws. Generally, an end effector's tilt may be defined in a variety of different ways, so long as it is defined consistently among all possible poses of the end effector (or at least all possible poses represented in index 154).

In some implementations, each reachability map in index 154 may include a plurality of cells (or "voxels"). In various implementations, each cell of the plurality of cells may represent a candidate base pose of robot 100. For example, in implementations in which robot 100 is a mobile robot (e.g., with base 165 being equipped with rollers or wheels), a base pose of robot 100 may include a position (x, y) of robot 100 on a plane, such as ground plane P, and a yaw of robot 100 (e.g., a rotation of robot about an axis that is normal to ground plane P, such as the Z axis). In some such implementations, each cell of the plurality of cells in a given reachability map may correspond to a particular base pose, and may include, e.g., in association with a geometric center of the cell, precomputed joint parameters that can be implemented in order to achieve a particular target end effector pose (e.g., the target end effector pose that is associated with the reachability map).

In some implementations, cells corresponding to base poses at which the target end effector pose is reachable may be flagged, e.g., as "reachable," and other cells may be flagged as "unreachable." For example, a robot arm such as that depicted in FIG. 1B has a limited reach. From a particular position of base 165, robot 100 can only reach up to a certain distance—any points outside of that may be unreachable. As another example, there may be some cells at which a robot singularity would occur if the robot attempted to reach the target end effector pose. In various implementations, those cells may be flagged as unreachable as well. Consequently, reachability maps may include clusters of reachable cells and then other, unreachable cells. As will be described further below, flagging cells as reachable/unreachable may reduce the size of the search space for potential joint parameter solutions. It also may exclude cells (and hence, base poses) that would result in singularities. Accordingly, it is possible to more quickly identify viable "seed" joint parameter solutions that can be used, for instance, with incremental inverse kinematics (e.g., gradient descent) to find optimal solutions.

In various implementations, techniques described herein may be triggered upon identification of a target pose of end effector 106. For example, a user may operate graphical user interface 160 to provide command(s) to robot 100 to move end effector 106 to a particular pose (e.g., to grab an object, turn on a light, etc.). In various implementations, a target end effector pose may include a translational component, e.g., x/y coordinates of a projection of end effector 106 onto ground plane 170. A target end effector pose may also include a variety of other information, depending on the nature of end effector 106. For example, there may be a variety of parameters that may be set for end effector 106. In various implementations, the target end effector pose may be used, e.g., by reachability map engine 152, to determine (e.g., calculate) a target distance D of end effector 106 from a plane (e.g., 170) and a target tilt T of end effector 106 relative to the plane.

As noted above, the target distance and tilt (D, T in FIG. 1B) may be used to select, from the plurality of reachability maps stored in index 154, a given reachability map that is, for instance, indexed by the target distance D and the target tilt T. It should be noted that the pair <D,T> is not limited to a particular translational location (i.e., a particular x/y coordinate). Intuitively, robot 100 may operate end effector 106 to have the same distance from ground plane 170 and the same tilt at multiple different locations in a room. Accordingly, a single reachability map may be employed for a given target <D,T> no matter where, translationally speaking, the target end effector pose is located.

In various implementations, once a reachability map is selected, a given (reachable) cell of the plurality of cells of the reachability map may be selected as a starting point joint parameter solution. For example, in some implementations, a cell corresponding to a current base pose of robot 100 (e.g., x, y, yaw) may be examined to determine whether it is reachable. If the answer is yes, then a joint parameter solution associated with that cell may be used as a candidate joint parameter solution, e.g., a "seed" joint parameter solution for incremental inverse kinematic purposes.

If the current cell is not reachable, then robot 100 may be moved/rotated accordingly. For example, and as was noted previously, a given reachability map likely will have a cluster (or multiple clusters, depending on a variety of factors) of reachable cells. In various implementations, a current base pose of the robot (e.g., x, y, yaw) relative to an x/y/yaw of the target end effector pose may be used to operate robot 100 to move to a given cell of a cluster of reachable cells. For instance, if it is desired to minimize translational movement of robot 100, robot 100 may be translated/rotated to a boundary of the cluster of cells. If instead it is desired to limit arm reach, then robot 100 may be operated so that it is translated to a center of the cluster of reachable cells. In either case, once the robot's base pose corresponds to a base pose associated with a reachable cell, techniques described herein may be employed to find a joint parameter solution based on the given cell.

In some implementations, the given cell that is selected may have an associated set of joint parameters. In some implementations these joint parameters may be associated with a center point of the given cell. However, it might be the case that the center of the given cell does not align precisely with translational and/or rotational (yaw) components of the target end effector pose that ultimately lead to selection of the current reachability map. Accordingly, in various implementations, incremental inverse kinematics (e.g., gradient descent) may be employed using the joint parameter solution associated with the center point of the given cell as a seed to compute one or more candidate joint parameter solutions. These one or more candidate joint parameter solutions may be more closely aligned with translational/rotational components of the true target end effector pose. By starting incremental inverse kinematics with at least one seed joint parameter solution identified in this manner, it is possible to reduce needless expenditure of computing resources that conventional techniques required by randomly selecting seed joint parameter solutions.

In some implementations, one or more additional cells of the plurality of reachable cells that are neighbors of the given cell may be identified and used to determine one or more additional candidate sets of joint parameters for the robot. For example, center points of each of the neighbor cells may be associated with additional joint parameter solutions. These additional joint parameter solutions may be used as additional seed joint parameter solutions, so that additional incremental inverse kinematics can be performed to calculate additional candidate joint parameter solutions beyond those already calculated. In various implementations, the number of neighbor cells that are considered may be determined based on a variety of factors. In some implementations, the number of neighbor cells considered may be selected by a user, e.g., as a parameter that is adjustable to choose between accuracy and speed.

In various implementations, a given set of joint parameters may be selected from a superset of candidate joint parameter sets. This superset may include, for instance, a first candidate set calculated using the initial seed joint parameter solution associated with the first selected reachable cell. This superset may also include the one or more additional candidate sets that were calculated based on seed joint parameter solutions associated with the neighbor cells. The given set of joint parameters may be selected from the superset based on a variety of factors, such as closeness to robot's 100 current pose, strain imposed on one or more operational components 104 of robot 100 by implementing each candidate joint parameter solution, time required to implement each candidate joint parameter solution, and so forth. Once the given set of joint parameters is selected, it may be used to operate the robot.

Figure 2:
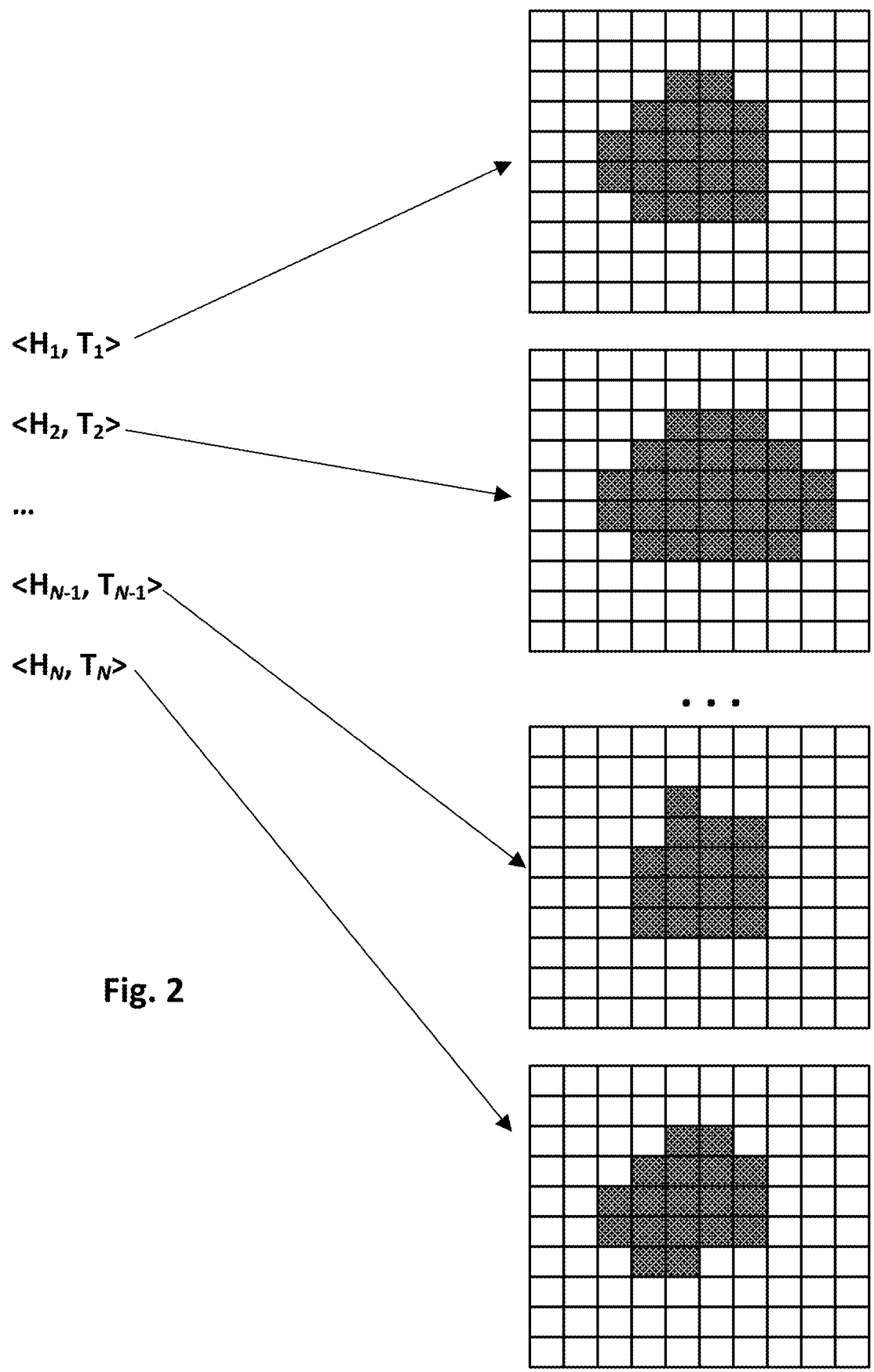
FIG. 2 schematically depicts an example of how reachability maps appear and may be indexed, in accordance with various implementations.

FIG. 2 schematically depicts an example of what reachability maps associated with individual height-tilt pairs of a robot might look like. While "height-tilt" pairs are described herein for illustrative purposes, this is not meant to be limiting. Other values may be used, and it should be understood that "height from ground plane" is merely a specific (but non-limiting) example of a "distance from a plane." A plurality of height-tilt pairs $<H_1, T_1> \ldots <H_N, T_N>$ are shown, each mapping to a respective reachability map. Each reachability map is divided into a plurality of cells. As described previously, each cell may be associated with a particular base pose of the robot for which the reachability maps were generated. While a particular number of cells are depicted in FIG. 2, this is for illustrative purposes only, and is not meant to suggest that reachability maps are limited to a particular number of cells and/or dimensions of cells.

Cells that are deemed (e.g., flagged in memory) as "reachable" are shaded in FIG. 2, and unreachable cells are not shaded. In the top reachability map, a cluster of reachable cells is visible more or less near the center of the plurality of cells, and the surrounding cells are not reachable. That means that when a robot has struck a base pose (e.g., x/y/yaw) that corresponds with one of the reachable cells in the top reachability map, the robot is able to achieve the height-tilt pair $<H_1, T_1>$. On the other hand the robot cannot achieve the height-tilt pair <$H_1$, $T_1$> when its base has struck a pose that corresponds to one of the surrounding unreachable cells.

FIG. 2 demonstrates how each given height-tilt pair is associated with its own reachability map. Thus, the reachability maps in FIG. 2 can be considered to be "indexed" based on their respective height-tilt pairs. As described herein, the height-tilt pairs calculated from a given target end effector pose do not necessarily incorporate translational (e.g., x/y) and/or rotational (e.g., yaw) components of the respective target end effector pose. Accordingly, multiple target end effector poses that share heights-tilts in common may all index to the same reachability map. The "extra" information unique to each target end effector pose, such as a translational components and yaw, may be used to move the robot and/or adjust the reachability map (e.g., translate and/or rotate it) to the robot's perspective. By reusing reachability maps for multiple target end effector poses, memory is conserved and the process of identifying a suitable reachability map is expedited.

In some implementations, all reachability maps for a particular robot may be loaded, for instance, into a fixed-size five dimensional array data structure (e.g., a C array). The dimensions of such an array may be, for instance, target height H, target tilt T, base x, base y, and base yaw. This may permit constant-time access to all cells of all reachability maps, leading to predictable and consistent operation of a robot. It also provides convenient and quick access to neighboring cells so that additional seed joint parameter solutions can be used as described previously.

Figure 3:
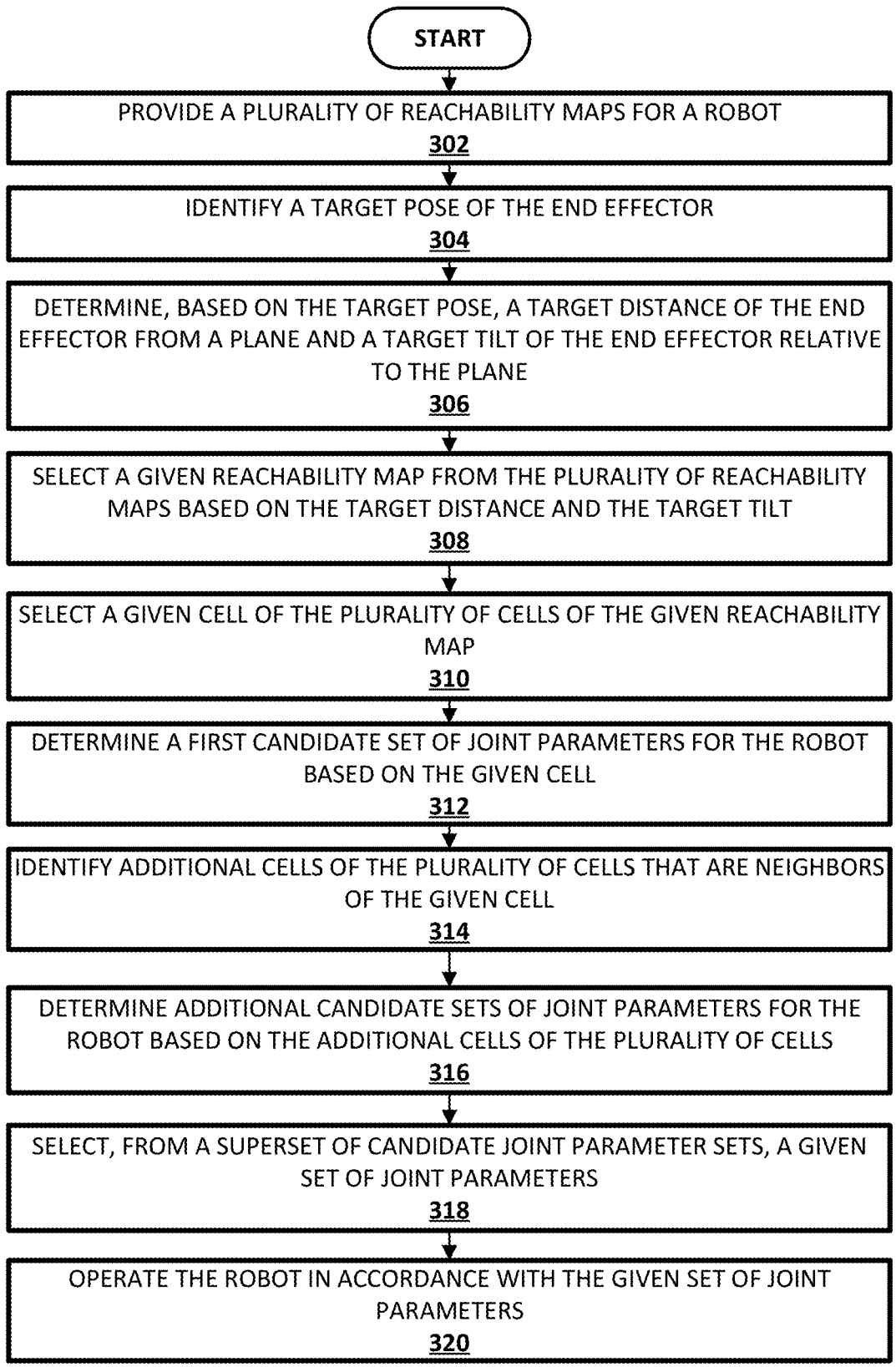
FIG. 3 depicts an example method in accordance with various implementations.

Referring now to FIG. 3, an example method 300 of practicing selected aspects of the present disclosure is described. For convenience, the operations of the flowchart are described with reference to a system that performs the operations. This system may include various components of various computer systems. For instance, some operations may be performed at robot 100, while other operations may be performed by one or more components of control system 150. Moreover, while operations of method 300 are shown in a particular order, this is not meant to be limiting. One or more operations may be reordered, omitted or added.

At block 302, the system may provide a plurality of reachability maps for a robot. These reachability maps may be precomputed for a particular robot and/or type of robot, and may be stored in one or more databases, such as index 154, so that they can be retrieved and used when needed (e.g., during robot operation). In some implementations, each reachability map of the plurality of reachability maps may be associated with a distance D of a reference point of an end effector from a plane (e.g., height from ground plane) and a tilt T of the end effector relative to the plane. Additionally or alternatively, in some implementation, each reachability map of the plurality of reachability maps may include a plurality of cells, and each cell of the plurality of cells may represent a candidate base pose of the robot. As noted previously, a candidate base pose may include, for instance, translational components such as x/y coordinates on a ground plane, and a yaw (e.g., rotation about the Z axis).

At block 304, the system may identify a target pose of the end effector as input for techniques described herein. For example, a user may provide one or more commands to a robot, such as "GRAB DISHES OFF KITCHEN TABLE AND PUT IN SINK." During trajectory planning for this task, one or more target end effector poses, such as the poses that are assumed when grasping the dishes and/or one or more poses assumed while travelling, may be identified. Additionally or alternatively, when attempting to grasp an object, a number of different candidate end effector poses may be tested/vetted to determine which is most likely to lead to a successful grasp. Each of these candidate end effector poses may be used as input for techniques described herein.

At block 306, the system may determine, based on the target pose of the end effector, a target distance of the end effector (e.g., height off ground) from the plane and a target tilt of the end effector relative to the plane. These values may be computed based on the target pose of the end effector using a variety of different mathematical techniques, such as algebra, geometry, trigonometry, etc. Which mathematical techniques are used may depend on a variety of factors, such as what imaginary or real structure is deemed to correspond, for instance, to an axis of the end effector, which point on the end effector is considered as the reference point (e.g., center of mass, midway between fingers, etc.), the operational capabilities of the robot, and so forth.

At block 308, the system may select, e.g., from index 154, a given reachability map from the plurality of reachability maps based on the target distance and the target tilt. As noted above, in some implementations, the plurality of reachability maps in index 154 may be indexed, for instance, on their respective distance-tilt pairs (e.g., height-tilt pairs).

At block 310, the system may select a given cell of the plurality of cells of the given reachability map, e.g., as a starting point. For example, the system may select a reachable cell that is closest translationally and/or rotationally closest to a current base pose of the robot. In some implementations, a reachable cell on a boundary of a cluster of reachable cells may be selected, e.g., when it is desired to reduce or minimize translational movement of a mobile robot. Additionally or alternatively, in some implementations, a reachable cell that lies as close to the "center" of a cluster of reachable cells may be selected, e.g., when it is desired to reduce or minimize robot arm reach.

At block 312, the system may determine a first candidate set of joint parameters for the robot based on the given cell selected at block 310. For example, the given cell may have associated with its center point a seed joint parameter solution. In various implementations, this seed joint parameter solution may itself be used as a first candidate set of joint parameters, or it may be used to determine the first candidate set of joint parameters, e.g., using incremental inverse kinematics.

At block 314, the system may identify one or more additional cells of the plurality of cells that are neighbors of the given cell. For example, in some implementations, the system may select any cell that shares a boundary with the given cell. In other implementations, the system may select a number of cells that is manually input by a user, e.g., as part of an accuracy versus speed decision. At block 316, the system may determine one or more additional candidate sets of joint parameters for the robot based on the one or more additional cells of the plurality of cells. For example, a joint parameter solution associated with a center point of each additional cell may be used as a seed joint parameter solution for incremental inverse kinematics purposes.

At block 318, the system may select, from a superset of candidate joint parameter sets that consists of the first candidate set determined at block 312 and the one or more additional candidate sets determined at block 316, a given set of joint parameters to be implemented to achieve the target pose of the end effector. At block 320, the system may operate the robot in accordance with the given set of joint parameters.

Techniques described herein may also be used to identify joint parameter solutions for multiple target end effector poses at once, e.g., by performing various operations using multiple reachability maps. Suppose robot 100 is instructed to interact with two (or more) objects. This may require a different target end effector pose for each object. If the two objects are sufficiently proximate to one another, techniques described herein can be used to identify one or more base poses that enable robot 100 to reach both objects, e.g., without requiring a base of robot 100 to be rotated/translated. In some implementations, a target height-tilt pair may be identified for each of the two target end effector poses. These pairs may be used to identify two corresponding reachability maps. In some implementations, these reachability maps may be rotated and/or translated as described herein (i.e. pursuant to the target end effector pose) and then used to calculate their intersection (e.g., a set of joint parameter solutions, and/or a set of reachable cells, that is shared across both reachability maps). This intersection may take the form of another reachability map that encodes (e.g., as reachable cells) base poses from which robot 100 can reach either of the two objects.

Similarly, suppose another a set of objects (and corresponding target end effector poses) are not all reachable by robot 100 from a single base pose. It is nonetheless possible to retrieve a reachability map for each target height-tilt pair, translate/rotate the multiple reachability maps accordingly, and compute a union between the multiple reachability maps. The result is another reachability map that encodes robot base poses from which the robot can reach at least one of the objects. Combining reachability maps as described herein may improve the operation of robot 100 in a variety of ways, e.g., by speeding up target and/or trajectory planning.

Figure 4:
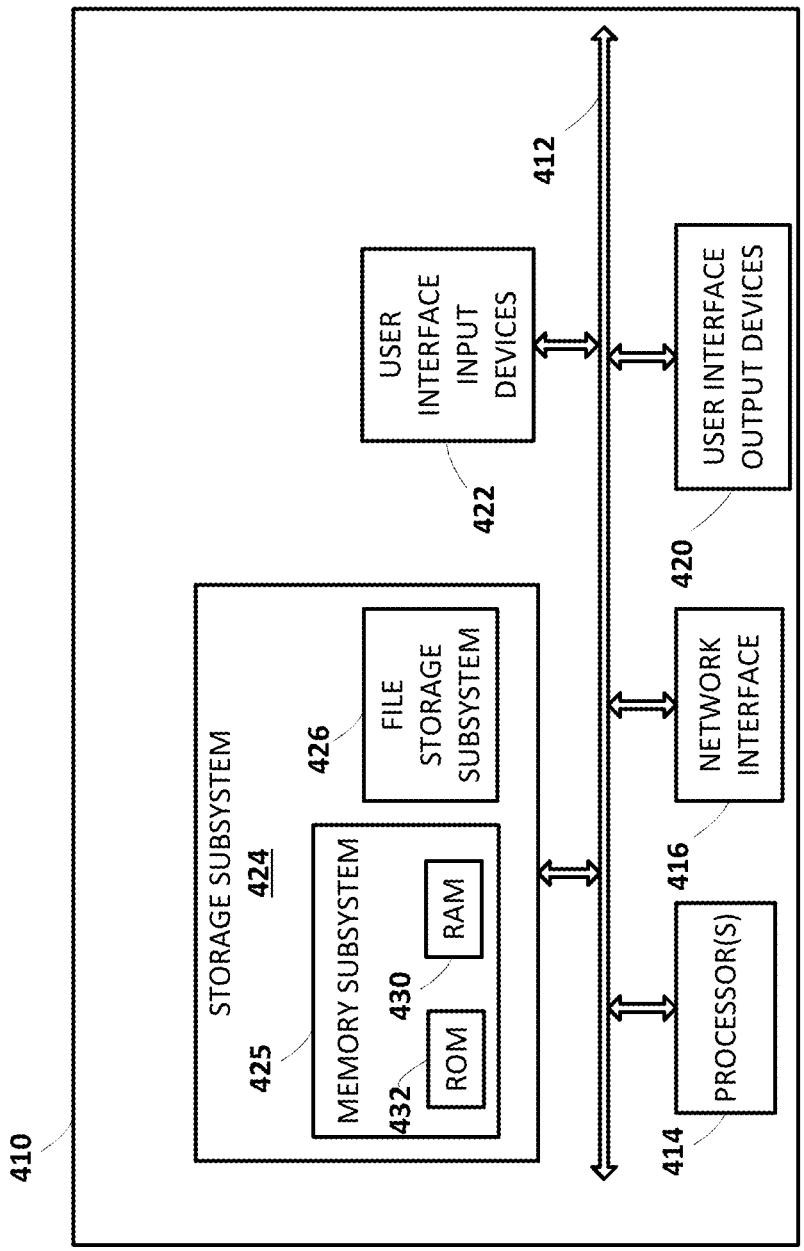
FIG. 4 schematically depicts an example architecture of a computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more aspects of robot 100 or control system 150. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a CD-ROM drive, an optical drive, or removable media cartridges. Modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
providing a plurality of reachability maps for a robot, each reachability map of the plurality of reachability maps being associated with a distance of a reference point of an end effector from a plane and a tilt of the end effector relative to the plane, and each reachability map of the plurality of reachability maps including a plurality of cells, wherein each cell of the plurality of cells represents a candidate base pose of the robot;
identifying a target pose of the end effector;
determining, based on the target pose of the end effector, a target distance of the end effector from the plane and a target tilt of the end effector relative to the plane;
selecting a given reachability map from the plurality of reachability maps based on the target distance and the target tilt;
selecting a given cell of the plurality of cells of the given reachability map;
determining a first candidate set of joint parameters for the robot based on the given cell;
identifying one or more additional cells of the plurality of cells that are neighbors of the given cell;
determining one or more additional candidate sets of joint parameters for the robot based on the one or more additional cells of the plurality of cells;
selecting, from a superset of candidate joint parameter sets that consists of the first candidate set and the one or more additional candidate sets, a given set of joint parameters to be implemented to achieve the target pose of the end effector; and
operating the robot in accordance with the given set of joint parameters.

2. The method of claim 1, wherein the candidate base pose represented by each cell of the plurality of cells of each of the plurality of reachability maps comprises an x coordinate, a y coordinate, and a yaw value.

3. The method of claim 1, wherein the given cell of the plurality of cells is selected based on a current base pose of the robot.

4. The method of claim 3, wherein the given cell lies on a boundary between a cluster of reachable cells of the plurality of cells and unreachable cells of the plurality of cells.

5. The method of claim 3, wherein the given cell lies at a center of a cluster of reachable cells of the plurality of cells.

6. The method of claim 1, wherein the first candidate set of joint parameters are calculated using incremental inverse kinematics based on a seed set of joint parameters associated with the given cell.

7. The method of claim 6, wherein the seed set of joint parameters are associated with a center point of the given cell.

8. The method of claim 6, wherein the incremental inverse kinematics include gradient descent.

9. The method of claim 1, further comprising:
identifying another target pose of the end effector;
determining, based on the another target pose of the end effector, another target distance of the end effector from the plane and another target tilt of the end effector relative to the plane;
selecting another reachability map from the plurality of reachability maps based on the another target distance and the another target tilt; and
determining an intersection or union between the given reachability map and the another reachability map;
wherein the given cell is selected from the intersection or union between the given reachability map and the another reachability map.

10. At least one non-transitory computer-readable medium comprising instructions that, in response to execution of the instructions by one or more processors, cause the one or more processors to perform the following operations:
providing a plurality of reachability maps for a robot, each reachability map of the plurality of reachability maps being associated with a distance of a reference point of an end effector from a plane and a tilt of the end effector relative to the plane, and each reachability map of the plurality of reachability maps including a plurality of cells, wherein each cell of the plurality of cells represents a candidate base pose of the robot;
identifying a target pose of the end effector;
determining, based on the target pose of the end effector, a target distance of the end effector from the plane and a target tilt of the end effector relative to the plane;
selecting a given reachability map from the plurality of reachability maps based on the target distance and the target tilt;
selecting a given cell of the plurality of cells of the given reachability map;
determining a first candidate set of joint parameters for the robot based on the given cell;
identifying one or more additional cells of the plurality of cells that are neighbors of the given cell;
determining one or more additional candidate sets of joint parameters for the robot based on the one or more additional cells of the plurality of cells;
selecting, from a superset of candidate joint parameter sets that consists of the first candidate set and the one or more additional candidate sets, a given set of joint parameters to be implemented to achieve the target pose of the end effector; and
operating the robot in accordance with the given set of joint parameters.

11. The at least one non-transitory computer-readable medium of claim 10, wherein the candidate base pose represented by each cell of the plurality of cells of each of the plurality of reachability maps comprises an x coordinate, a y coordinate, and a yaw value.

12. The at least one non-transitory computer-readable medium of claim 10, wherein the given cell of the plurality of cells is selected based on a current base pose of the robot.

13. The at least one non-transitory computer-readable medium of claim 12, wherein the given cell lies on a boundary between a cluster of reachable cells of the plurality of cells and unreachable cells of the plurality of cells.

14. A system comprising one or more processors and memory operably coupled with the one or more processors, wherein the memory stores instructions that, in response to execution of the instructions by one or more processors, cause the one or more processors to perform the following operations:
providing a plurality of reachability maps for a robot, each reachability map of the plurality of reachability maps being associated with a distance of a reference point of an end effector from a plane and a tilt of the end effector relative to the plane, and each reachability map of the plurality of reachability maps including a plurality of cells, wherein each cell of the plurality of cells represents a candidate base pose of the robot;
identifying a target pose of the end effector;
determining, based on the target pose of the end effector, a target distance of the end effector from the plane and a target tilt of the end effector relative to the plane;
selecting a given reachability map from the plurality of reachability maps based on the target distance and the target tilt;
selecting a given cell of the plurality of cells of the given reachability map;

determining a first candidate set of joint parameters for the robot based on the given cell;

identifying one or more additional cells of the plurality of cells that are neighbors of the given cell;

determining one or more additional candidate sets of joint parameters for the robot based on the one or more additional cells of the plurality of cells;

selecting, from a superset of candidate joint parameter sets that consists of the first candidate set and the one or more additional candidate sets, a given set of joint parameters to be implemented to achieve the target pose of the end effector; and operating the robot in accordance with the given set of joint parameters.

15. The system of claim 14, wherein the candidate base pose represented by each cell of the plurality of cells of each of the plurality of reachability maps comprises an x coordinate, a y coordinate, and a yaw value.

16. The system of claim 14, wherein the given cell of the plurality of cells is selected based on a current base pose of the robot.

17. The system of claim 16, wherein the given cell lies on a boundary between a cluster of reachable cells of the plurality of cells and unreachable cells of the plurality of cells.

18. The system of claim 16, wherein the given cell lies at a center of a cluster of reachable cells of the plurality of cells.

19. The system of claim 14, wherein the first candidate set of joint parameters are calculated using incremental inverse kinematics based on a seed set of joint parameters associated with the given cell.

20. The system of claim 19, wherein the seed set of joint parameters are associated with a center point of the given cell.

* * * * *